(12) United States Patent
Oh et al.

(10) Patent No.: US 11,427,214 B2
(45) Date of Patent: Aug. 30, 2022

(54) METHOD OF SYNCHRONIZING DRIVING CHARACTERISTICS OF DIFFERENT VEHICLES

(71) Applicants: HYUNDAI MOTOR COMPANY, Seoul (KR); KIA MOTORS CORPORATION, Seoul (KR)

(72) Inventors: Ji Won Oh, Hwaseong-si (KR); Jeong Soo Eo, Hwaseong-si (KR); Sung Jae Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 132 days.

(21) Appl. No.: 16/924,350

(22) Filed: Jul. 9, 2020

(65) Prior Publication Data

US 2021/0039661 A1 Feb. 11, 2021

(30) Foreign Application Priority Data

Aug. 8, 2019 (KR) .................... 10-2019-0096814

(51) Int. Cl.
*B60W 50/06* (2006.01)
*B60W 40/13* (2012.01)
*B60W 50/14* (2020.01)

(52) U.S. Cl.
CPC ............ *B60W 50/06* (2013.01); *B60W 40/13* (2013.01); *B60W 50/14* (2013.01);
(Continued)

(58) Field of Classification Search
CPC ...... B60W 50/06; B60W 40/13; B60W 50/14; B60W 2050/146; B60W 2540/10; B60W 2540/12
See application file for complete search history.

(56) References Cited

U.S. PATENT DOCUMENTS

2003/0055674 A1* 3/2003 Nishiyama ............. G06Q 10/06
705/321
2009/0292413 A1* 11/2009 Kubotani ............ B60R 16/0231
701/96
(Continued)

FOREIGN PATENT DOCUMENTS

KR 10-0938217 B1 1/2010

OTHER PUBLICATIONS

Beard et al., "Synchronization of Information in Distributed Multiple Vehicle Coordinated Control", 2003, IEEE (Year: 2003).*
(Continued)

*Primary Examiner* — Fadey S. Jabr
*Assistant Examiner* — Naeem Taslim Alam
(74) *Attorney, Agent, or Firm* — McDonnell Boehnen Hulbert & Berghoff LLP

(57) ABSTRACT

The present disclosure provides a method of displaying the driving characteristics of a current vehicle in comparison with those of a previous vehicle and synchronizing the driving characteristics of the current vehicle with those of the previous vehicle by changing driving-characteristic-related setup data of the current vehicle in response to a driver request. Accordingly, the driving characteristics of the current vehicle is synchronized with the driving characteristics of the previous vehicle, and thus even if a driver drives a completely different type of vehicle, a familiar sense of traveling and sense of driving is provided.

14 Claims, 6 Drawing Sheets

(52) U.S. Cl.
CPC ... *B60W 2050/146* (2013.01); *B60W 2540/10* (2013.01); *B60W 2540/12* (2013.01)

(56) References Cited

U.S. PATENT DOCUMENTS

| | | | | |
|---|---|---|---|---|
| 2010/0057294 | A1* | 3/2010 | Otten | G06Q 30/0603 |
| | | | | 701/33.4 |
| 2010/0100263 | A1* | 4/2010 | Aoki | B60K 6/547 |
| | | | | 701/22 |
| 2011/0251782 | A1* | 10/2011 | Perkins | G06Q 10/04 |
| | | | | 701/123 |
| 2014/0077942 | A1* | 3/2014 | Jayamohan | B60K 35/00 |
| | | | | 340/441 |
| 2014/0310277 | A1* | 10/2014 | Ricci | G08G 1/096811 |
| | | | | 707/736 |
| 2016/0084374 | A1* | 3/2016 | Kim | F16H 59/66 |
| | | | | 701/51 |
| 2017/0217423 | A1* | 8/2017 | Aoki | B60W 20/40 |
| 2018/0236997 | A1* | 8/2018 | Quix | B60W 20/15 |
| 2019/0071112 | A1* | 3/2019 | Toddenroth | B62D 1/046 |
| 2019/0176824 | A1* | 6/2019 | Patel | B60W 50/082 |
| 2020/0051153 | A1* | 2/2020 | Chrzan | G06Q 30/0282 |
| 2020/0262349 | A1* | 8/2020 | Oniwa | H04N 5/2628 |

OTHER PUBLICATIONS

KR app No. KR 10-2019-0000526, filed Jan. 3, 2019, entitled "Device for and Method of Controlling Traveling Characteristic of Vehicle," translation attached.

* cited by examiner

METHOD OF SYNCHRONIZING DRIVING CHARACTERISTICS OF DIFFERENT VEHICLES

CROSS REFERENCE TO RELATED APPLICATIONS

This application claims under 35 U.S.C. § 119(a) the benefit of priority to Korean Patent Application No. 10-2019-0096814 filed on Aug. 8, 2019, the entire contents of which are incorporated herein by reference.

BACKGROUND

(a) Technical Field

The present disclosure relates to a method of synchronizing the driving characteristics of different vehicles, and more particularly to a method of synchronizing the driving characteristics of other vehicle types with the driving characteristics of a specific vehicle.

(b) Background Art

In general, a vehicle has unique characteristics for respective vehicle types, which include those related to a power device, a brake device, a suspension device, or the like.

In addition, drivers also have different respective driving tendencies, and recently, a function of selecting a desired driving mode by a driver among various driving modes of the vehicle so as to provide a function, performance, and a sense of driving desired by the driver has come to be provided in vehicles.

For example, various driving modes configured by differently setting a driving pattern, such as an eco-friendly mode, a normal mode, or a sports mode have been developed and have been applied to an eco-friendly vehicle that is driven using a motor as a vehicle driving source, such as a hybrid vehicle or an electric vehicle.

A driver may select a desired driving mode among the eco-friendly mode, the normal mode, and the sports mode, and it may be possible to select and switch the driving mode by simply manipulating a button by the driver.

Here, the eco-friendly mode is a mode to which a control strategy for control in terms of fuel efficiency and a sense of smooth propulsion is applied, the normal mode is a mode to which a control strategy for improving propulsion characteristics and providing dynamic sense of driving compared with the eco-friendly mode is applied, and the sports mode is a mode to which a control strategy for a propulsion torque inclination and a unique gear-shift pattern for providing a sense of sporty propulsion rather than fuel efficiency is applied.

However, with regard to various driving modes of a vehicle, control parameters, setup data for control, or the like for the respective modes are fixed at values that are set by a vehicle manufacturer, and thus, a driver is capable of only selecting one of a plurality of driving modes of which control parameters or setup data are separately preset.

In this case, in the vehicle, the driving state of the vehicle is controlled using a control parameter or setup data of a driving mode selected by the driver, which is preset to a fixed value for the corresponding mode.

That is, when the driver selects the driving mode, the vehicle is controlled only by the control parameter or the setup data that is preset for the driving mode by a vehicle manufacturer, and the driver is not capable of directly changing or resetting a control parameter or setup data related to a sense of driving in a currently traveling vehicle.

Accordingly, although various driving modes are provided, the traveling characteristics of a vehicle, for example, the driving characteristics (a sense of driving) such as the sense of acceleration or deceleration that a driver experiences while driving the vehicle do not satisfy all drivers.

A small number of driving modes are provided, and also, a control parameter and setup data are fixed values in a single driving mode, and thus, recently, drivers have desired the ability to use differentiated driving patterns that are further subdivided and better satisfy the driving tendencies of the drivers.

Accordingly, there is provided a technology for controlling traveling characteristics to allow a driver to directly change and set a parameter value for determining the driving characteristics (sense of driving) and traveling characteristics of a vehicle in the vehicle, which is disclosed in Korean Patent Application No. 10-2019-0000526 (Jan. 3, 2019), filed by the present applicant.

When a driver who has driven one vehicle for a long time drives a different type of vehicle, they may experience a sense of unfamiliarity and may frequently express displeasure at the sense of unfamiliarity.

For example, when the acceleration and deceleration performance of a newly purchased vehicle is very different from an existing vehicle, a driver may largely experience a sense of unfamiliarity while the vehicle accelerates and decelerates, which may cause accidents while traveling in severe cases.

SUMMARY

In one aspect, the present disclosure provides a method of displaying the driving characteristics of the current vehicle in comparison with those of a previous vehicle.

The present disclosure provides a method of synchronizing the driving characteristics of the current vehicle with those of the previous vehicle by changing driving-characteristic-related setup data of the current vehicle in response to a driver request.

The present disclosure provides a method of intuitively and effectively setting driving characteristics by providing a user interface for adjusting a hard or smooth degree of driving characteristics compared with the previous vehicle while the driver checking the degree.

In a preferred embodiment, a method of synchronizing driving characteristics of different vehicles includes displaying information on driving characteristics of a first vehicle and information on driving characteristics of a second vehicle, and synchronizing the displayed driving characteristics of the second vehicle with the driving characteristics of the first vehicle in response to a driver request for setting synchronization.

The synchronizing of the driving characteristics may include synchronizing the driving characteristics by setting a driving characteristic map of the second vehicle using Equation 1 below:

$$M_b(u) = V_b^{-1} V_a(M_a(u)) \qquad \text{Equation 1}$$

where u is a driver input, $M_a$ is a driving characteristic map of the first vehicle, $M_b$ is a driving characteristic map of the second vehicle, $V_a$ is unique characteristics of the first vehicle, and $V_b$ is unique characteristics of the second vehicle.

BRIEF DESCRIPTION OF THE FIGURES

The above and other features of the present disclosure will now be described in detail with reference to certain exemplary embodiments thereof illustrated in the accompanying drawings which are given herein below by way of illustration only, and thus are not limitative of the present disclosure, and wherein.

DETAILED DESCRIPTION

Figure 1:
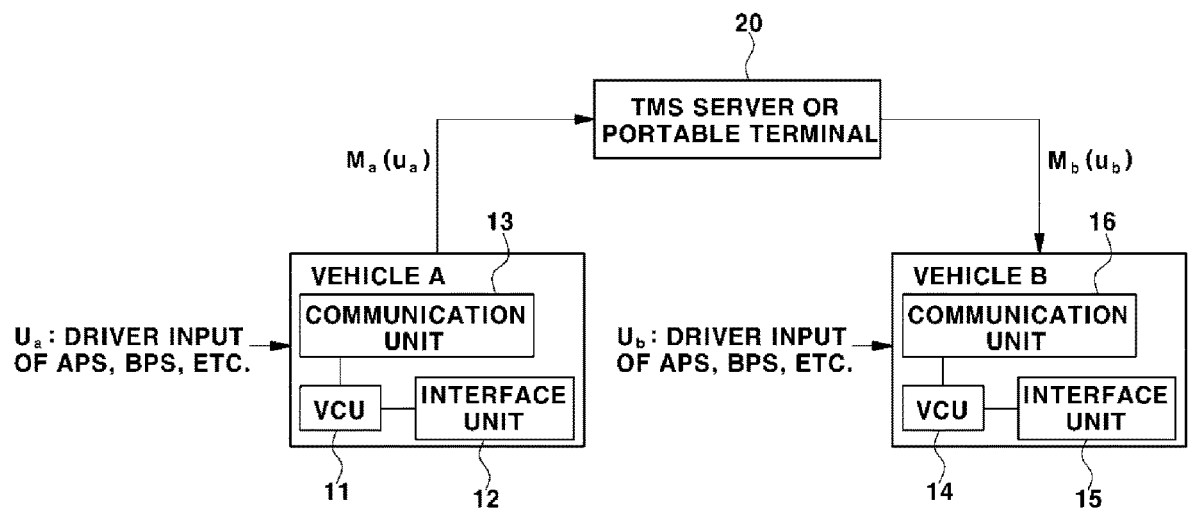
FIG. 1 is a block diagram showing the configuration of a system for performing a procedure of synchronizing the driving characteristics of different vehicles according to an embodiment of the present disclosure.

Exemplary embodiments of the present disclosure are described in detail with reference to the accompanying drawings so that those of ordinary skill in the art may easily implement the disclosure. However, the present disclosure may be implemented in various different forms, and is not limited to these embodiments.

In the specification, when a certain part is said to "include" a certain component, this indicates that the part may further include another component, rather than necessarily excluding the other component, unless noted otherwise.

The present disclosure may provide a method of displaying the driving characteristics of a current vehicle (a second vehicle) in comparison with those of a previous vehicle (a first vehicle), and synchronizing the driving characteristics of the current vehicle with those of the previous vehicle by changing driving-characteristic-related setup data of the current vehicle in response to a driver request.

According to an embodiment of the present disclosure, the current vehicle may have information on the driving characteristics of the previous vehicle, and may be configured to compare information on the driving characteristics of the previous vehicle and the current vehicle and to provide the comparison result.

According to an embodiment of the present disclosure, the driving characteristics of the previous vehicle and the current vehicle may be compared with each other, and the driving characteristics of the two vehicles may also be synchronized with each other.

In the specification, the previous vehicle refers to a vehicle (the first vehicle) in which setup information and data related to the traveling characteristics and driving characteristics of the vehicle are preset by a driver, and the current vehicle refers to a vehicle as a synchronization target, that is, a vehicle (the second vehicle) in which setup information and data related to driving characteristics is supposed to be set in comparison with the driving characteristics of the previous vehicle.

For example, the previous vehicle may be a vehicle that was previously driven by a driver, and in which setup data related to the traveling characteristics and driving characteristics of the vehicle are set to a value desired by the driver, and the current vehicle may be a vehicle that is newly purchased by the driver or another vehicle that the driver desires to newly begin to drive.

In particular, the current vehicle may be a vehicle in which the driver intends to adjust and change setup information and setup data for control in comparison with those of the previous vehicle in order to allow the driver to experience traveling characteristics, a sense of traveling, and a sense of driving similar to those of the previous vehicle.

In the present disclosure, "driving characteristics" is a term that comprehensively refers to actions of a vehicle in response to driving input of a driver, and may also refer to a sense of traveling or a sense of driving that the driver experiences due to the characteristics of the vehicle while the driver drives the vehicle.

In more detail, according to the present disclosure, the driving characteristics may be changed depending on a driving-characteristic-related parameter value set by the driver using control logic, and thus may also refer to the characteristics of the vehicle, and the sense of traveling and the sense of driving that the driver experiences from the vehicle in a controlled state of the vehicle when the state of the vehicle is controlled while the vehicle is being driven or manipulated.

According to an exemplary embodiment of the present disclosure, the driving characteristics of the vehicle may include at least one of an acceleration, a responsiveness, a sensitivity, or a maximum speed of the vehicle in response to driver manipulation of an accelerator pedal or a brake pedal.

According to an exemplary embodiment of the present disclosure, synchronization of the driving characteristics of two different vehicles means that setup information and setup data for control related to the driving characteristics of the current vehicle are adjusted in comparison with the driving characteristics of the previous vehicle in such a way that the two vehicles provide characteristics such as vehicle an acceleration, a responsiveness, a sensitivity, or a maximum speed at a substantially equivalent level.

In particular, the synchronization of driving characteristics may refer to equalization of all individual characteristics of driving characteristics, or alternatively, may refer to individual activity for harmonizing each of individual characteristics, for example, a vehicle acceleration, a responsiveness, a sensitivity, or a maximum speed.

For example, in order to synchronize characteristics of acceleration, the driver may newly set a parameter value in comparison with a value for the previous vehicle in a setup mode of a user interface, and thus may set the characteristics of acceleration of the current vehicle to be the same as the characteristics of acceleration of the previous vehicle.

During this procedure, the current parameter value and the newly set or changed parameter value may be displayed through a screen in the setup mode, and thus may allow the driver to check and recognize the set and changed state of the parameter value.

In this case, when a corresponding vehicle is a vehicle having various driving modes such as eco-friendly, normal, and sports modes, it is preferable that the driving characteristics or the like may be displayed based on the mode that is the most fundamental and has driving characteristics at an intermediate level, for example, the normal mode (that is, the normal mode is the default mode).

In more detail, according to the present disclosure, first, a parameter value may be a value related to driving characteristics (a sense of driving) and traveling characteristics when a vehicle is controlled, and may refer to a setup value for each item that affects or changes the traveling characteristics, a sense of driving, and a sense of traveling of the vehicle using control logic when the driver sets or changes a parameter value for each predetermined parameter item.

Accordingly, according to the present disclosure, when the driver changes and sets the parameter value, the traveling characteristics of the vehicle may be adjusted depending on the set parameter value, and the driver may experience a sense of driving of the vehicle, corresponding to the adjusted traveling characteristics.

According to the present disclosure, data that is preset in a vehicle or is newly set and changed by the driver with respect to a plurality of predetermined parameter items related to the driving characteristics and traveling characteristics of the vehicle may be referred to as driving characteristic data.

According to the present disclosure, it may be possible to select and use a setup mode for allowing the driver to set and change a parameter value related to the driving characteristics and traveling characteristics of the vehicle.

According to the present disclosure, as described above, the driver may set and change parameter values in a setup mode, and default parameter values may also be stored in a controller of the vehicle.

Thus, when the driver performs manipulation for initializing driving characteristic data (parameter values of items related to driving characteristics) of a corresponding vehicle through an interface unit of the vehicle or a portable terminal, parameter values may be changed to a default value as an initial setup value from a value that is previously changed and set by the driver in the vehicle, and then the default value may also be applied as parameter values to control logic for control of traveling of the vehicle.

Here, the default value may be a predetermined parameter value corresponding to traveling characteristics and driving characteristics in a normal mode, which is already applied in a general vehicle, or a predetermined parameter value corresponding to an eco-friendly mode instead of the existing normal mode.

According to the present disclosure, the parameter value (driving characteristic data) that is set by the driver in the controller of the previous vehicle and setup data for control in comparison with the parameter value may be transmitted to and stored in a TMS server or a portable terminal of the driver, and then the stored driving characteristic data and setup data of the previous vehicle may be transmitted to the controller of the current vehicle from the TMS server or the portable terminal of the driver, and may be stored in the controller of the current vehicle.

According to the present disclosure, the controller of the current vehicle may display the driving characteristic data and setup data of the previous vehicle, received from the TMS server or the portable terminal of the driver as described above, through an interface unit.

In addition, the controller of the current vehicle may convert the driving characteristic data and setup data of the previous vehicle into those of the current vehicle, and then may perform a synchronization of applying the converted driving characteristic data and setup data to the control logic of the current vehicle.

In particular, according to the present disclosure, the driver may adjust and select a parameter value for each item through a setup mode provided by the interface unit of the current vehicle, in which case the parameter value, and setup data related to the driving characteristics of the current vehicle may be changed in comparison with the driving characteristics of the previous vehicle.

Here, the driving-characteristic-related setup data may be a map of the control logic as described below.

As a result, after a synchronization procedure with the previous vehicle is completed in the current vehicle, the driver may also experience driving characteristics similar to those of the previous vehicle in response to the driving input by the driver in the current vehicle.

Hereinafter, the present disclosure will be described with reference to the drawings. FIG. 1 is a block diagram showing the configuration of a system for performing a procedure of synchronizing the driving characteristics of different vehicles according to an embodiment of the present disclosure.

In FIG. 1, a vehicle A may be a previous vehicle, a vehicle B may be a current vehicle, and the two vehicles may be different vehicles having different unique characteristics.

According to the present disclosure, substantially, synchronization of driving characteristics may be changing of setup data in a VCU 14 of the current vehicle (the vehicle B) in comparison with setup data set in a vehicle control unit (VCU) 11 of a previous vehicle (the vehicle A).

In this case, the VCUs 11 and 14 of the two vehicles may be, for example, a vehicle control unit (VCU), which is the highest-ranking controller in a vehicle.

In response to driving input by the driver for driving the vehicle, the VCUs 11 and 14 of the vehicles may determine a control value depending on a driving input value input by the driver using setup data to which a parameter value preset by the driver is applied.

Here, the setup data may be a map of data about definition of a relationship between a driving input value and a control value of the driver, and the setup data may be any form other than a map as long as the form defines a relationship between the driving input value and the control value and may be, for example, a line plot, a mathematical formula, or a table.

The control value may be a control target value that is determined and used depending on the driving input value input by the driver in the control logic, a parameter value corresponding to the control target value, or the like.

In FIG. 1, $u_a$ indicates a driving input value input by the driver in the previous vehicle (the vehicle A), and may be, for example, an accelerator position sensor (APS) value that is a value dependent upon driver manipulation of an accelerator pedal of the driver, a brake position sensor (BPS) value that is a value dependent upon driver manipulation of a brake pedal, or the like.

In FIG. 1, $u_b$ indicates a driving input value input by the driver in the current vehicle (the vehicle B), and may also be the APS value, the BPS value, or the like.

In FIG. 1, $M_a(u_a)$ indicates a map used to determine the control value corresponding to the driving input value input by the driver in the vehicle A, which is the previous vehicle, and $M_b(u_b)$ indicates a map used to determine the control value corresponding to the driving input value input by the driver in the vehicle B, which the current vehicle.

$M_a(u_a)$ and $M_b(u_b)$ may indicate that the maps are functions using $u_a$ and $u_b$ as inputs, respectively.

The maps may be setup data that are related to parameter values and are applied to the control logic in the VCU 11 of the previous vehicle(the vehicle A) and the VCU 14 of the current vehicle(the vehicle B).

The driver may set and adjust the parameter value in the setup mode provided through interface units 12 and 15 of the vehicle, and in response to the parameter value that is set and adjusted by the driver and input from the interface units 12 and 15, the VCUs 11 and 14 may change the setup data based on information on the parameter value.

In the system of FIG. 1, when the VCU 11 of the previous vehicle transmits driving-characteristic-related data of a corresponding vehicle to a telematics multimedia system (TMS) server or portable terminal 20 for providing a telematics service through a communication unit 13 of the vehicle, the driving-characteristic-related data transmitted from the VCU 11 of the previous vehicle may be stored in the TMS server or portable terminal 20.

According to the present disclosure, the transmitted driving-characteristic-related data of the vehicle may be set by the driver in the setup mode provided through the interface unit 12 of the previous vehicle (vehicle A), and may be a parameter value related to driving characteristics (driving characteristic data) and the map $M_a(u_a)$ that is setup data to which the parameter value is applied.

That is, the VCU 11 of the previous vehicle may transmit a parameter value (which may be driving characteristic data, that is, a plurality of parameter values), set and adjusted by the driver, and the map $M_a(u_a)$ (which may be maps for respective parameter items), which is setup data corresponding to the parameter value, to the TMS server or portable terminal 20 through the communication unit 13 of the VCU 11, and the TMS server or portable terminal 20 may store the parameter value and the map $M_a(u_a)$, which are transmitted from the VCU 11 of the previous vehicle.

Then, when the driver changes from an existing vehicle to the current vehicle (the vehicle B) because they buy a new vehicle or replace their previous vehicle, the parameter value and the map $M_a(u_a)$ as setup data of the previous vehicle (the vehicle A), which are stored in the TMS server or portable terminal 20, may be transmitted to the current vehicle.

In addition, a parameter value set in the previous vehicle and a map used in the previous vehicle may be transmitted to a portable terminal of the driver from the TMS server.

Thus, the portable terminal of the driver may receive the parameter value, and the map or the VCU 14 of the current vehicle (the vehicle B) may receive the parameter value and the map through a communication unit 16 of the vehicle.

As a result, the portable terminal 20 or the VCU 14 of the current vehicle (the vehicle B) may display information on the parameter value related to the driving characteristics (driving characteristic data) of the previous vehicle (the vehicle A) through the interface unit 15 of the vehicle and may let the driver see the same.

In this case, the portable terminal 20 or the interface unit 15 of the current vehicle may compare the parameter value related to the driving characteristics of the previous vehicle with those of the previous vehicle and may display information on the parameter value in the current vehicle (the vehicle B).

A parameter value to be applied to the current vehicle may be adjusted through the portable terminal 20 or the interface unit 15 of the vehicle, and setup data required in the control logic of the current vehicle may be set and changed.

When the driver adjusts the parameter value of the current vehicle in the setup mode provided through the portable terminal 20 or the interface unit 15 of the vehicle, if the driver selects the parameter value of the previous vehicle, the setup data of the current vehicle may be synchronized with the setup data of the previous vehicle.

According to an embodiment of the present disclosure, the TMS server or the portable terminal 20 of the driver may be configured to receive, in advance, setup data of the previous vehicle, information on the unique characteristics of the previous vehicle and the current vehicle, and the like and to perform synchronization on setup data based on the received information, in which case the TMS server or portable terminal 20 may transmit the synchronized setup data as the synchronization result to the current vehicle.

Here, the synchronized setup data may be, for example, a driving characteristic map $M_b(u_b)$ synchronized by converting the driving characteristic map $M_a(u_a)$ used in the previous vehicle using the information on the unique characteristics of the two vehicles.

As a result, the current vehicle (the vehicle B) may receive the converted map $M_b(u_b)$ through the communication unit 16 of the vehicle, and may apply the same to the control logic of the VCU 14, thereby achieving synchronization of harmonizing settings of the current vehicle (the vehicle B) with settings of the previous vehicle (the vehicle A).

Accordingly, in the current vehicle after synchronization, a control value may be determined in response to driving input by the driver using the map $M_b(u_b)$ in the control logic.

In FIG. 1, the communication units 13 and 16 may be components of a vehicle that communicate with the outside, and may be a telematics terminal, a Bluetooth module of the vehicle, or the like.

According to an embodiment of the present disclosure, when it is difficult to completely synchronize driving characteristics due to a performance difference between vehicle types, provision of settings including the most similar driving characteristics may be interpreted as being included in synchronization.

Figure 2:
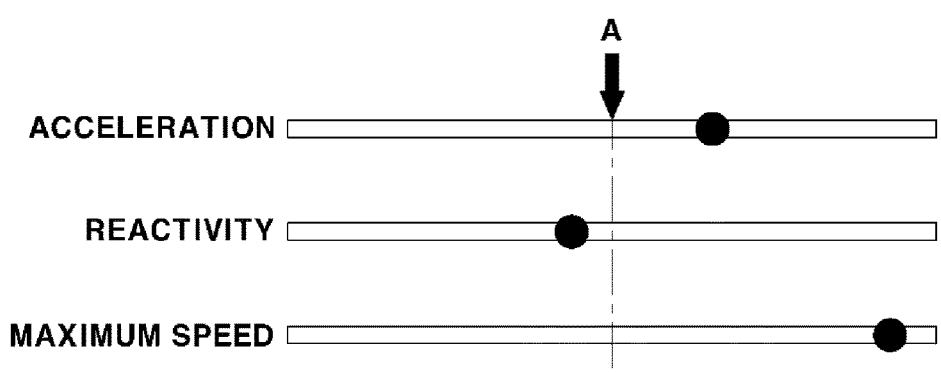
FIG. 2 is a diagram showing an example of a user interface of a synchronization setup mode according to a first embodiment of the present disclosure.

FIG. 2 is a diagram showing an example of a user interface of a synchronization setup mode according to a first embodiment of the present disclosure, and illustrates an example of a synchronization setup mode provided by the TMS server or portable terminal 20, or the interface units 12 and 15 of the vehicles.

In order to synchronize different vehicles according to the present disclosure, a current vehicle as well as a previous vehicle may provide the user interface of the synchronization setup mode illustrated in FIG. 2 through the interface units 12 and 15 illustrated in FIG. 1, and all setup values set in the synchronization setup mode may be stored in the VCUs 11 and 14 of the corresponding vehicles.

As such, the interface units 12 and 15 of the vehicles may display an image of the synchronization setup mode, and a driver may perform manipulation of changing a setup value through the image of the synchronization setup mode displayed on the interface units 12 and 15 of the vehicles.

Here, the setup value may be a parameter value, and the changing of the setup value may mean that the setup value is changed to the aforementioned setup data, that is, a map proper to a vehicle type.

For example, the changing of the setup value may mean that the current vehicle changes a default map to the map $M_b(u_b)$ for synchronization with the previous vehicle in FIG. 1, and here the map $M_b(u_b)$ may be received by the current vehicle (the vehicle B) from the TMS server or portable terminal 20, as described above.

In addition, the user interface of the synchronization setup mode may be provided to the portable terminal from the TMS server and may be displayed on the portable terminal, or may also be configured to be autonomously provided and displayed by the portable terminal.

As shown in FIG. 2, as an example of the synchronization setup mode, a driving characteristic setup value (a parameter value) for each item of the current vehicle may be displayed in comparison with the driving characteristics of other vehicle types in the user interface according to the first embodiment of the present disclosure.

Thus, characteristics for respective driving characteristic parameters of the other vehicle type (i.e., the type of the previous vehicle) and a current vehicle type (i.e., the type of the current vehicle) may be easily and intuitively compared with each other.

According to an embodiment of the present disclosure, a button or an icon of the other vehicle type may be selected in the synchronization setup mode, and thus the selected driving characteristics of the other vehicle type and the current vehicle type may be conveniently synchronized with each other.

Referring to FIG. 2, driving characteristic parameters, such as an acceleration, a responsiveness, and a maximum speed, may each be displayed in the form of a bar graph, and in this case, the driving characteristics of the current vehicle may be displayed as a driving point on the bar graph.

Each driving characteristic parameter may be configured to have a value that is increased by moving the driving point to the right from the left on the bar graph.

In FIG. 2, A indicates driving characteristics set in the vehicle A, which is a different vehicle type from the current vehicle, and in an example of FIG. 2, the driving characteristic parameter of the current vehicle and a setup value thereof are aligned and displayed in comparison with the setup value of the vehicle A.

In the case of an interface according to the first embodiment, settings of the driving characteristics of the current vehicle may be changed to a desired level by moving a driving point on a bar graph for each parameter item to a desired position by clicking and then dragging the driving point.

In particular, in a display method according to the first embodiment, a driving characteristic value (or parameter value) for each parameter item set in the current vehicle may be displayed with the driving characteristics of the vehicle A, as shown in FIG. 2, and thus the driver may intuitively compare and recognize the set state of each driving characteristic parameter in the current vehicle type compared with the other vehicle type.

As such, according to the first embodiment of the present disclosure, a synchronization button for synchronization with the other vehicle type may be included in the user interface, and may be provided in the form of an icon displayed in a display, and accordingly, when the driver clicks an icon for a corresponding vehicle type, driving characteristic parameters may be determined as synchronized values in consideration of both of the corresponding vehicle type and the vehicle type of the current vehicle.

According to the present disclosure, with respect to a predetermined parameter item related to the driving characteristics of the previous vehicle, a parameter value of the same parameter item related to the driving characteristics of the current vehicle as the parameter item of the previous vehicle may be synchronized.

For example, like in the example of FIG. 2, when the icon A is clicked, settings of corresponding parameter items of the current vehicle may be synchronized with the settings of the acceleration, responsiveness, and maximum speed of the vehicle A.

Thus, the driver may drive the current vehicle using driving characteristics the same as or similar to the driving characteristics of the vehicle A, which is a previous vehicle of a different vehicle type.

Although not shown in FIG. 2, the interface according to the first embodiment may be configured to be capable of changing the type of the previous vehicle used as a reference.

For example, the user interface may include a vehicle switch button for selecting switching of a vehicle, and when the driver clicks the vehicle switch button, the vehicle type may be switched, and simultaneously, information on the driving characteristics of the new vehicle type may be displayed as a reference.

Figure 3:
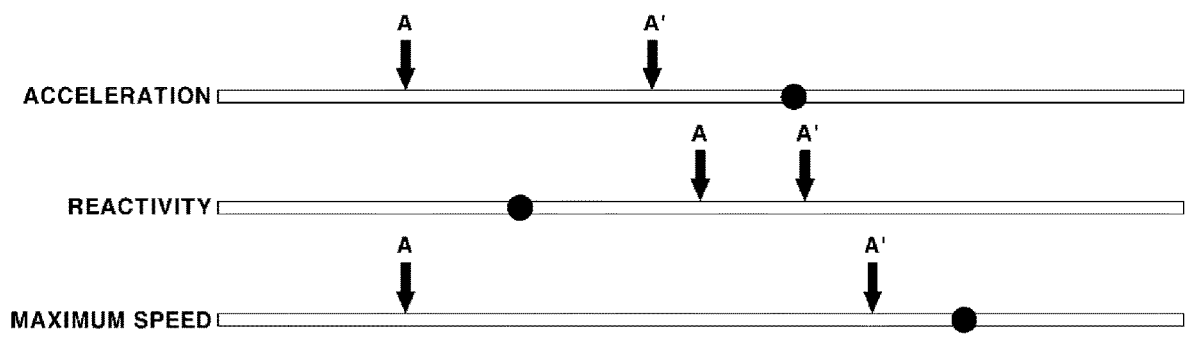
FIG. 3 is a diagram showing an example of a user interface of a synchronization setup mode according to a second embodiment of the present disclosure.

For example, as shown in FIG. 3, in the state in which the driving characteristics of the vehicle type of the vehicle A (a first vehicle) are displayed as a reference, the driver may select a vehicle type as a vehicle type of a vehicle A' (a third vehicle) instead of the vehicle type of the vehicle A.

In this case, the driving characteristics of the current vehicle may be displayed in comparison with the vehicle type of the vehicle A', selected by the driver, through the portable terminal 20 or the interface unit 15.

FIG. 3 is a diagram showing an example of a user interface of a synchronization setup mode according to a second embodiment of the present disclosure.

As shown in FIG. 3, according to the second embodiment, a settable section for each item of a driving characteristic parameter may be displayed, and the position of a driving characteristic parameter value of the other vehicle type in the section may also be displayed, in which case the positions of driving characteristic parameter values of a plurality of vehicle types may be displayed.

For example, in FIG. 3, information on the driving characteristics of a vehicle type of the vehicle A and a vehicle type of the vehicle A' may be displayed, and driving points corresponding to the driving characteristics of the current vehicle may be displayed therewith.

According to the second embodiment, settings of the driving characteristics of the current vehicle may be changed by dragging the driving point on the bar graph, which is the same as in the first embodiment.

A driving characteristic parameter value of the current vehicle may be synchronized with that of the other vehicle type by selecting an icon thereof.

According to the second embodiment, differently from the first embodiment, the driving characteristics of each vehicle may be specified for each item of a corresponding driving characteristic parameter, and thus each item of the driving characteristics, that is, an acceleration, a responsiveness, and a maximum speed may be compared and set between the vehicle type of the vehicle A and the vehicle type of the vehicle A'.

In addition, settings may be configured to be changed to display only information on the driving characteristics of the current vehicle alone rather than displaying information on the driving characteristics of previous vehicles in response to a driver request.

Hereinafter, a relationship between driving characteristics of different vehicles will be described with reference to FIGS. 4 to 8, and a procedure of synchronization between different vehicles will be described schematically with reference to the drawings.

In order to display relative driving characteristics between different vehicles, the relationship between the two vehicle types as a comparison target needs to be established first, and here, the relationship may be based on a physical model, and may mean that a behavior difference between the two vehicles in response to the same driving input by the driver (e.g., an APS value, which is a manipulation amount of an accelerator pedal, or a BPS value, which is a manipulation amount of a brake pedal) is predicted through the model.

Figure 4:
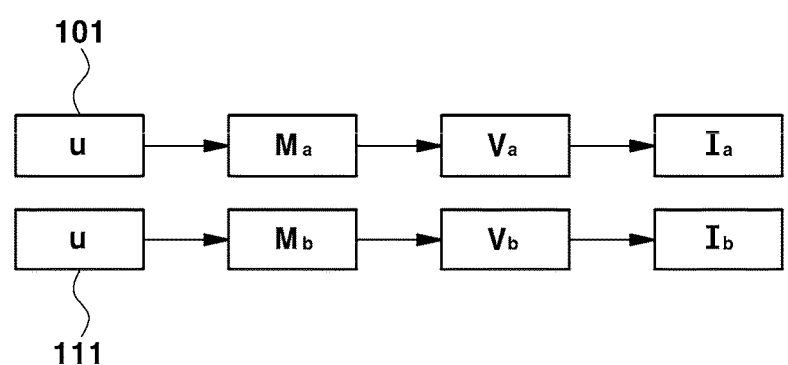
FIG. 4 is a diagram for explaining a procedure of synchronizing driving characteristics according to a prediction result of a vehicle behavior in response to input with respect to different vehicles according to an embodiment of the present disclosure.

To this end, a vehicle behavior, generated in response to driving input by the driver with respect to the two different vehicles as a comparison result, will be described with reference to FIG. 4, and FIG. 4 is a diagram for explaining a procedure of synchronizing driving characteristics according to the prediction result.

In detail, when the previous vehicle, which was previously driven, is referred to as the vehicle A, and the current vehicle, which is a new vehicle, the driving characteristics of which need to be set, is referred to as the vehicle B, u may refer to driving input by the driver, and $M_a$ and $M_b$ may refer to a map as setup data for determining the driving characteristics of the vehicle A and the vehicle B.

The maps $M_a$ and $M_b$ may be maps applied to the control logic related to driving characteristics in the vehicle A and the vehicle B, and may be setup data in a controller, which defines the relationship between a driving input value and a control value.

$V_a$ and $V_b$ may be unique characteristics of respective vehicles, and may include, for example, the weight of a vehicle, the rigidity of a suspension device, the height of a center of gravity, a gear ratio, and the efficiency of a transmission.

In addition, $I_a$ and $I_b$ may refer to behaviors of respective vehicles in response to driving input by the driver, such as an input to an accelerator pedal or input to a brake pedal, and when the control values $M_a(u)$ and $M_b(u)$ dependent upon the driving input 'u' of the driver in the control logic are obtained from the maps $M_a$ and $M_b$, the behaviors $I_a$ and $I_b$ of the vehicle may be determined by applying a value of the unique characteristics of a vehicle while the vehicle is controlled depending on the obtained control values.

FIG. 4 may be summarized according to a formula, and first the vehicle behaviors $I_a$ and $I_b$ may be represented using Equations 1 and 2 below.

$$I_a = V_a(M_a(u)) \qquad \text{[Equation 1]}$$

$$I_b = V_b(M_b(u)) \qquad \text{[Equation 2]}$$

For synchronization as a target, the vehicle behaviors $I_a$ and $I_b$ of the different vehicles may be represented based on the same input 'u' using Equation 3 below.

$$I_a = I_b \qquad \text{[Equation 3]}$$

In the example of FIG. 4, when an input u of 101 results in a final vehicle behavior $I_a$ through $M_a$ and $V_a$, the vehicle A and the vehicle B may be synchronized with each other by changing settings to equalize the vehicle behavior $I_b$ of the vehicle B and the vehicle behavior $I_a$ of the vehicle A in response to the same input u of 111.

In this regard, a driving characteristic map may be changed by setting driving characteristics by the driver, and $V_a$ and $V_b$, are the unique characteristics of vehicles as non-changeable values, and thus synchronization may be achieved by adjusting the driving characteristic map $M_b$ of the vehicle B.

In order to obtain a set value for the driving characteristic map $M_b$ for synchronization, the following procedure is performed.

$$V_a(M_a(u)) = V_b(M_b(u)) \qquad \text{[Equation 4]}$$

$$M_b(u) = V_b^{-1} V_a(M_a(u)) \qquad \text{[Equation 5]}$$

Thus, when the driving characteristic map $M_b$ of the vehicle B is set using Equation 5 above, the driving characteristics of the vehicle B may be synchronized with the driving characteristics of the vehicle A.

In this regard, for setting a relative command map based on the previous vehicle, the most important factor is a synchronization point.

Primarily, a setup value of a map for synchronizing driving characteristics with the previous vehicle needs to be obtained, and secondarily a driving characteristic parameter needs to be changed to be lowered or increased compared with the setup value.

Needless to say, a setup value that exceeds the physical performance limit of a vehicle may not be valid.

Figure 5:
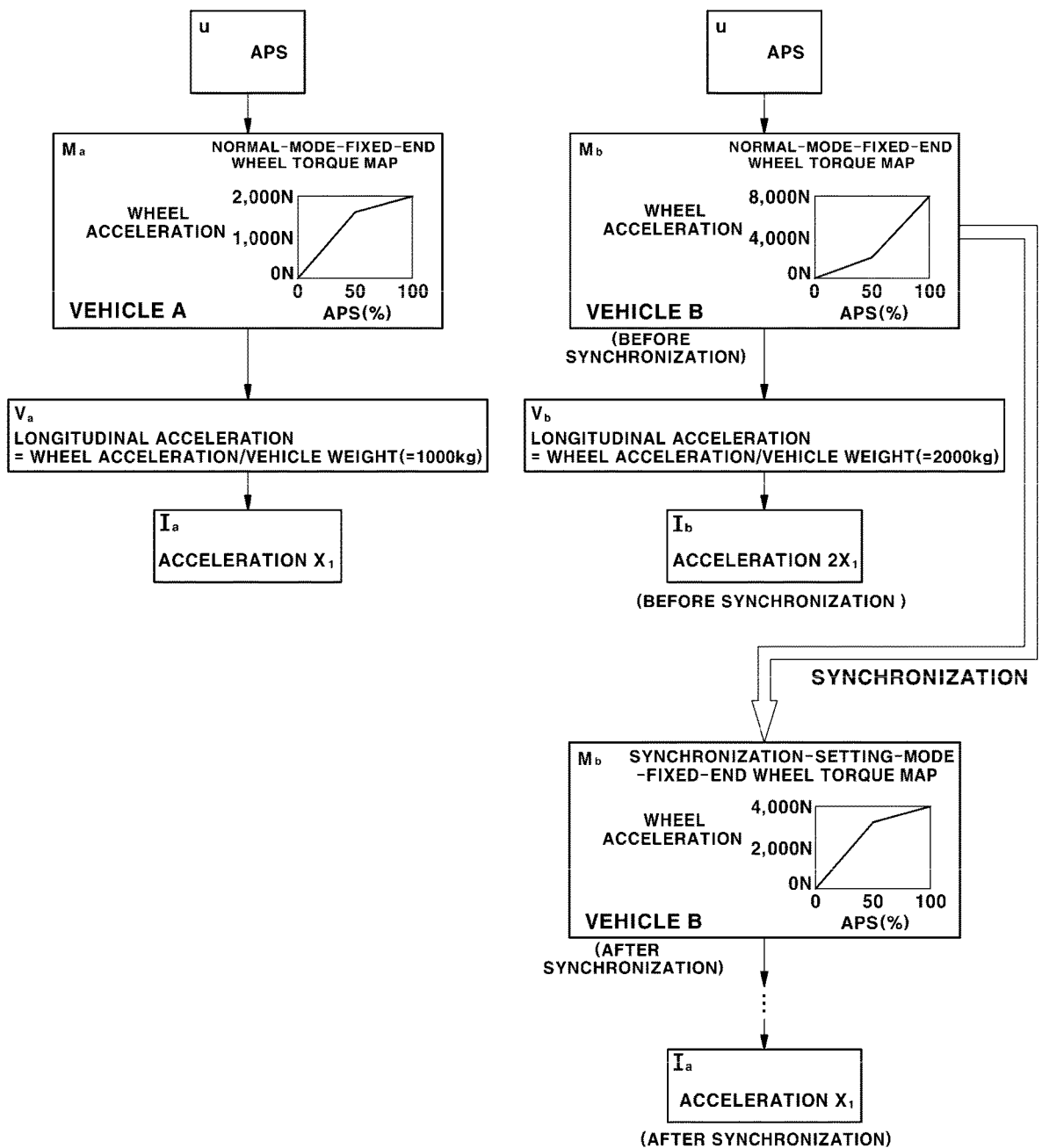
FIGS. 5, 6, 7, and 8 show various examples of synchronization of the driving characteristics of different vehicles.
Figure 6:
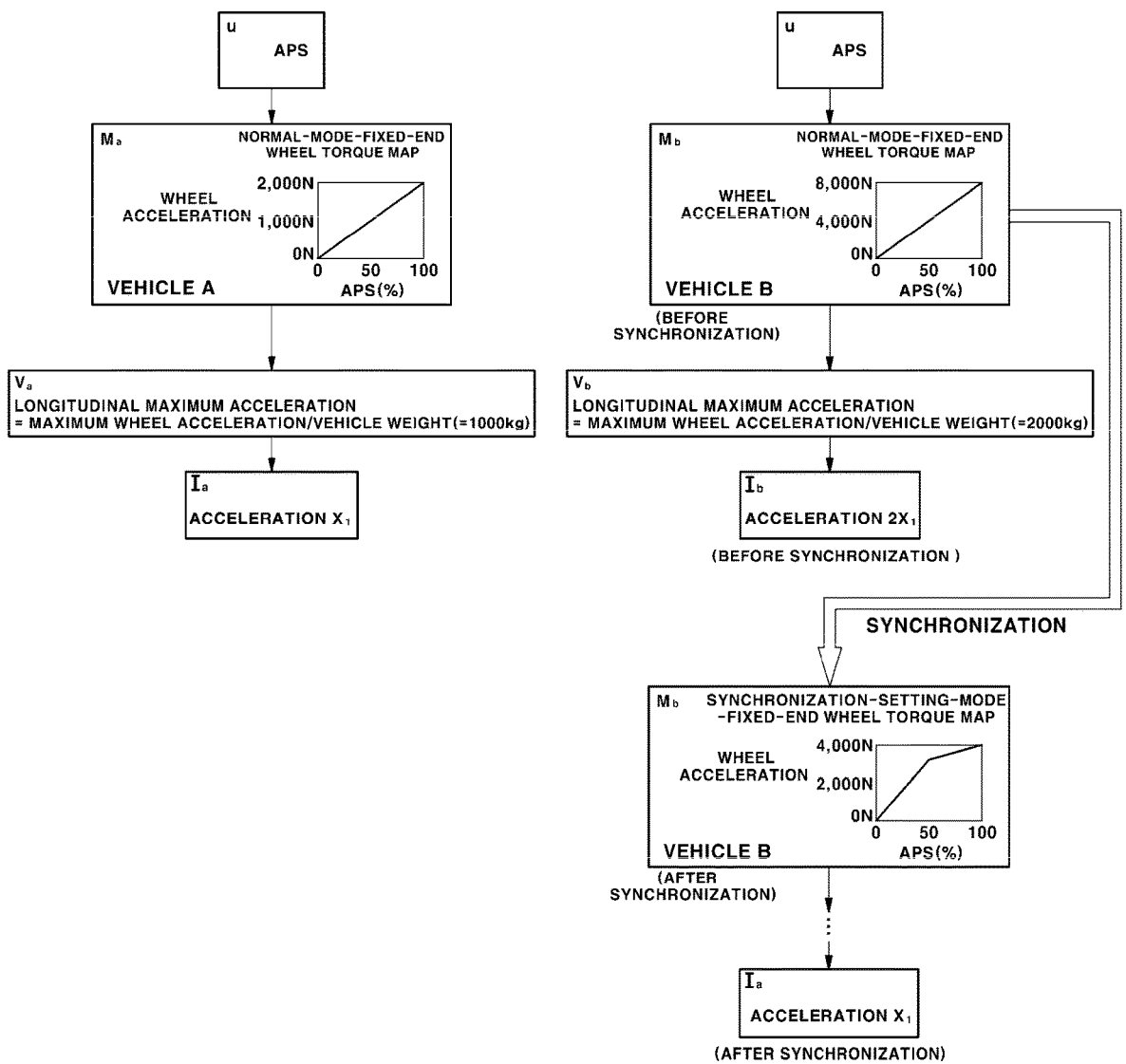

FIGS. 5 to 8 show examples of synchronization of driving characteristics of different vehicles, FIG. 5 illustrates an example of synchronization of the sensitivity of an accelerator pedal, and FIG. 6 illustrates an example of synchronization of maximum acceleration.

Figure 7:
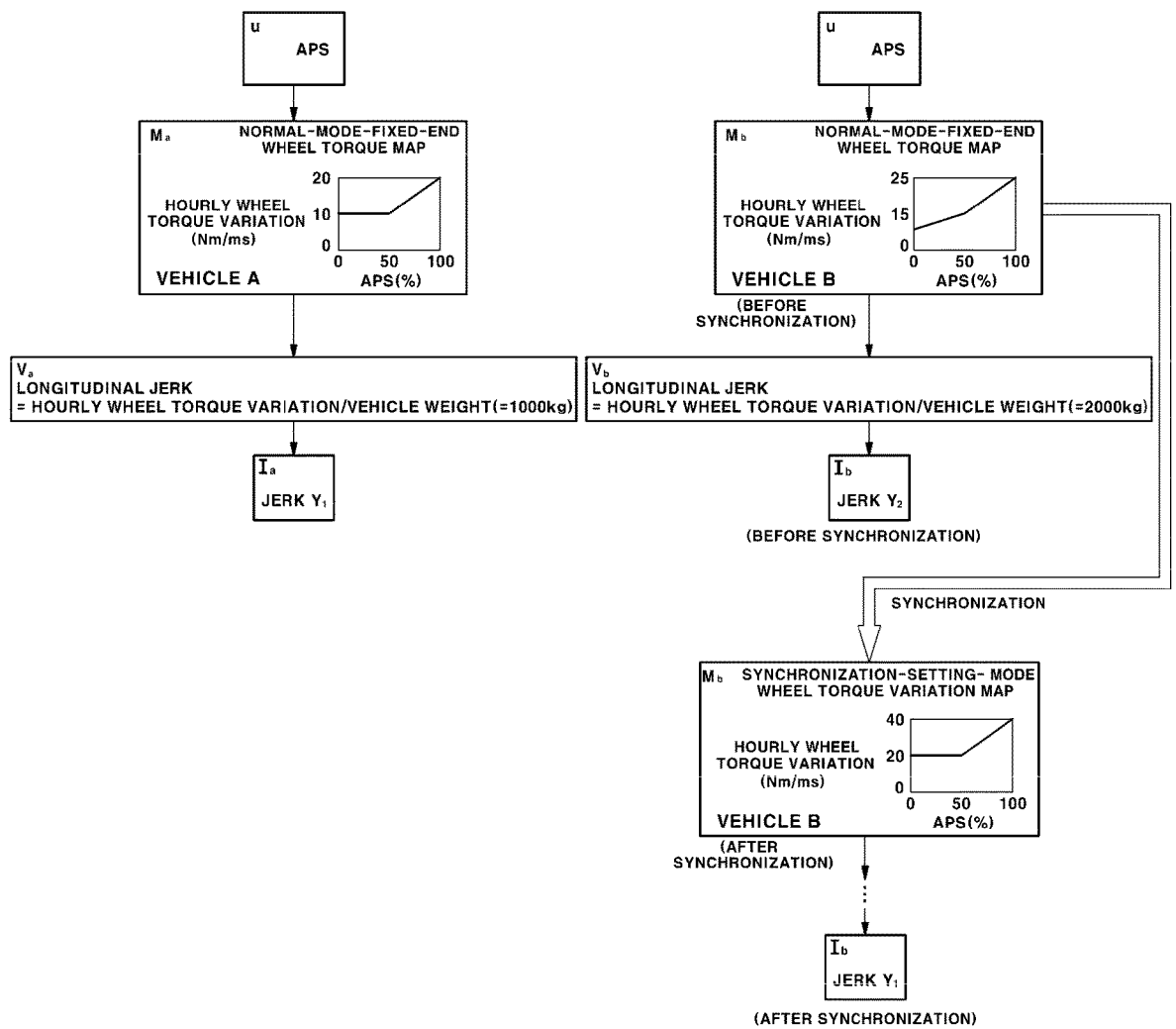
Figure 8:
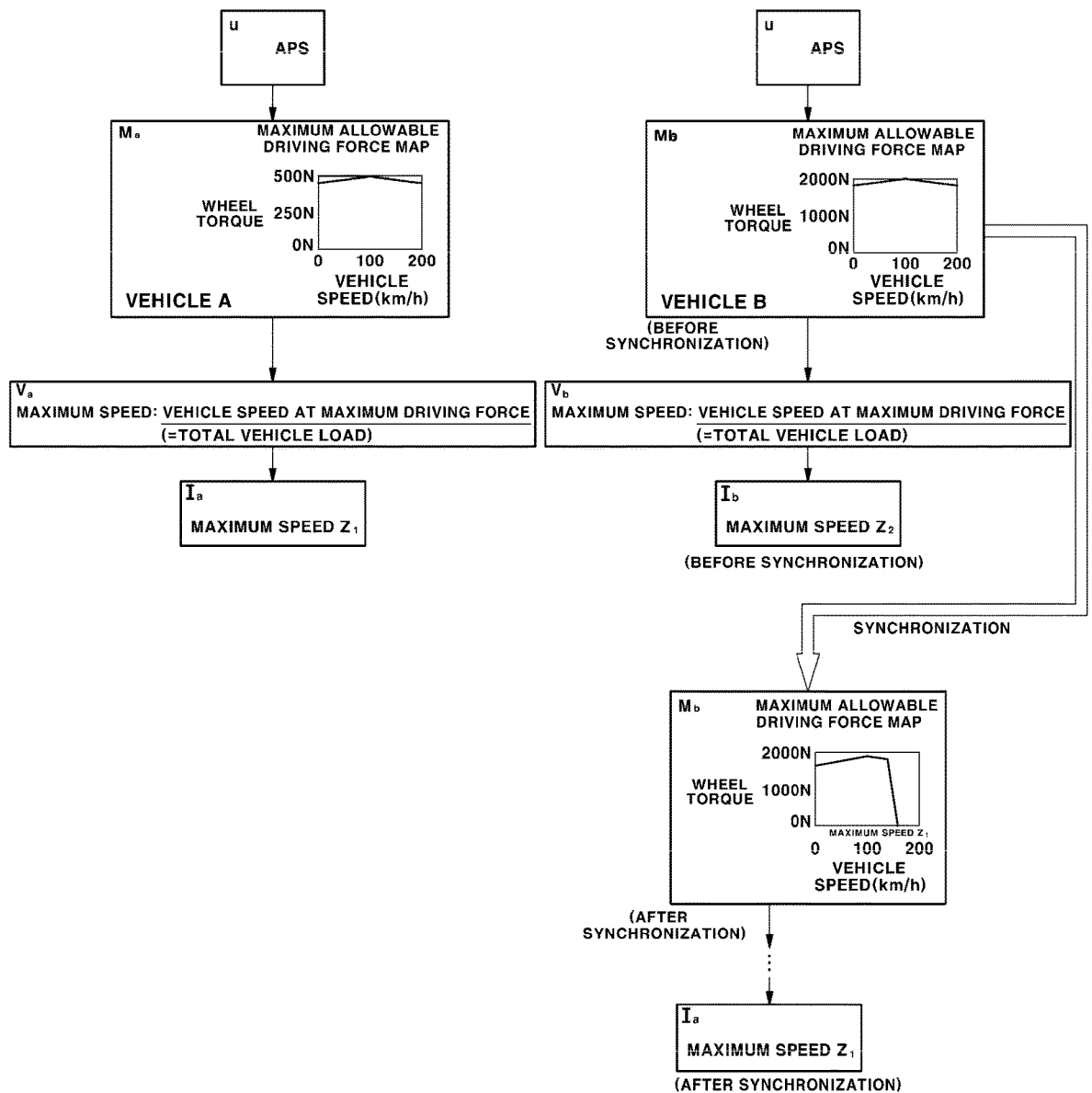

FIG. 7 illustrates an example of synchronization of the responsiveness of an accelerator pedal, and FIG. 8 illustrates an example of synchronization of maximum speed.

Although FIGS. 5 to 7 illustrate an example in which driving input of a driver is an APS value, a BPS value may also be applied instead of the APS value.

In the example of FIGS. 5 and 6, the driving characteristic map may be an APS/wheel-torque map, in the example of FIG. 7, the driving characteristic map may be an APS/hourly-wheel-torque map, and in the example of FIG. 8, the driving characteristic map may be a vehicle-speed/maximum-allowable-driving-force map.

In the present disclosure, synchronization may mean that different vehicles are synchronized based on a normal mode, and thus like in the examples of FIGS. 5 to 8, a map before synchronization of the vehicle A and the vehicle B may be a map of the normal mode.

In the example of FIG. 5, an accelerator position sensor (APS) value may be used as driving input of a driver, in which case the output may be a longitudinal acceleration $X_1$.

The upper part of FIG. 5 illustrates the driving characteristics of the vehicle A, the lower part of FIG. 5 illustrates the driving characteristics of the vehicle B, and FIG. 5 illustrates wheel torque maps (APS/wheel-torque maps), which define a relationship between wheel torque and an APS value as driving input by the driver, as driving characteristic maps for the respective vehicles.

A wheel torque map of each vehicle may be stored in a controller and may be applied to control logic of a corresponding vehicle, and the wheel torque map may be a map used to determine a wheel torque value corresponding to an APS value as driving input of a driver in the control logic of each vehicle.

In the example of FIG. 5, the values $V_a$ and $V_b$ of the unique characteristics of the two vehicles may be the weight of a vehicle, and the weights of the vehicle A and the vehicle B may differ by a factor of two.

In the example of FIG. 5, wheel torque may be related to wheel acceleration of a vehicle, wheel acceleration of the vehicle may indicate longitudinal acceleration to which a unique characteristic value of the vehicle is applied, and longitudinal acceleration determined depending on an APS value as driving input by the driver may determine the behavior of the vehicle, that is, longitudinal acceleration.

In the case of the vehicle B, both a map before synchronization and a map after synchronization are illustrated, and output before synchronization is different from that of the vehicle A, but an output after synchronization may be the same as that of the vehicle A.

That is, longitudinal acceleration as a vehicle behavior phenomenon dependent upon a manipulation amount of an accelerator pedal as driving input by the driver may also indicate driving characteristics, and the longitudinal acceleration of the vehicle A and the synchronized longitudinal acceleration of the vehicle B may be the same because a wheel torque map as the driving characteristic map of the vehicle B is synchronized.

In the example of FIG. 5, when synchronization is not performed, longitudinal acceleration of the vehicle B, the weight of which is twice that of the vehicle A, may be twice the longitudinal acceleration of the vehicle A, but when a map value is corrected in the driving characteristic map of the vehicle B to achieve synchronization, the driving characteristics (vehicle longitudinal acceleration depending on an APS value) of the vehicle A and the vehicle B may be equalized.

In order to achieve synchronization, a map value, i.e., a map setup value of the driving characteristic map of the vehicle B needs to be adjusted to equalize the output of the vehicle A and the output of the vehicle B in response to the same driving input by the driver, which may be performed using Equation 4 above.

In the example of FIG. 5, $V_b/V_a$, which is the weight ratio of the two vehicles, is 2, and thus the map value of the vehicle B needs to be twice the map value of the vehicle A in response to the same input.

That is, a wheel torque value dependent upon an APS value in an APS/wheel-torque map applied to the control logic of the vehicle B may be adjusted to be twice the wheel torque value of the map of the vehicle A using Equation 6 below.

$$M_b(u)=(2000)(1/1000)(M_a(u))=2M_a(u) \quad \text{[Equation 6]}$$

As a result, in the vehicle B, the driving characteristic map synchronized with the vehicle A may be used, and thus an output in response to driving input by the driver may be similar to that of the vehicle A, and the driver may also experience the same driving characteristics as the vehicle A in the vehicle B.

FIGS. 6, 7, and 8 also illustrate examples of synchronization of the driving characteristics of different vehicles, and illustrate examples of synchronization of the driving characteristics of the vehicle B with the driving characteristics of the vehicle A by adjusting and resetting a value of a control map for determining driving characteristics in a synchronization procedure.

FIGS. 5 to 8 illustrate several examples of a parameter item to which synchronization of driving characteristics is applicable, and all features of FIGS. 5 to 8 are exemplary, and the present disclosure is not limited thereto, and accordingly the method of synchronizing the driving characteristics of different vehicles proposed by the present disclosure may be applicable to various parameter items.

In the specification, the first vehicle in the claims may refer to the previous vehicle, and the second vehicle may refer to the current vehicle.

According to the present disclosure, the driver may previously recognize the driving characteristics of the current vehicle compared with the previous vehicle.

According to the present disclosure, the driving characteristics of the current vehicle may be intuitively displayed in comparison with the vehicle that is previously used, and thus the driver may accurately recognize information on the driving characteristics of the current vehicle, and the driving characteristics of the vehicle may be set to a level desired by the driver.

According to an exemplary embodiment of the present disclosure, the driving characteristics of the current vehicle may be synchronized with the driving characteristics of the previous vehicle, and thus even if a driver drives a completely different type of vehicle, a familiar sense of traveling and sense of driving may be provided.

According to the present disclosure, a user interface for adjusting a degree of hardness or smoothness of driving characteristics compared with the previous vehicle while the driver recognizes the degree thereof may be provided, and thus a method of intuitively and effectively setting driving characteristics may be provided.

The disclosure has been described in detail above with reference to exemplary embodiments thereof. However, it will be appreciated by those skilled in the art that corrections and changes may be made to elements of the disclosure without departing from the scope of the disclosure. In addition, many changes may be made to special circumstances or material without departing from the scope of the disclosure. Accordingly, the disclosure is not limited by the detailed description of exemplary embodiments thereof, and various modifications and improvements using the basic concept of the disclosure defined in the following claims fall within the scope of the disclosure.

The invention claimed is:

1. A method of synchronizing driving characteristics of different vehicles, the method comprising:
    displaying information regarding driving characteristics of a first vehicle and information regarding driving characteristics of a second vehicle; and
    synchronizing the driving characteristics of the second vehicle with the driving characteristics of the first vehicle in response to a driver request for setting synchronization;
    wherein the displaying information regarding the driving characteristics of the first vehicle and displaying information regarding the driving characteristics of the second vehicle comprises:
        displaying driving points of the driving characteristics of the first vehicle and the driving characteristics of the second vehicle on a bar graph for a predetermined parameter item related to the driving characteristics of the second vehicle;
    wherein the driving characteristics of the second vehicle are displayed as a driving point on the bar graph; and
    wherein the synchronizing of the driving characteristics comprises synchronizing a parameter item related to the driving characteristics by moving a driving point of the second vehicle displayed on the bar graph to a position of a driving point indicating the driving characteristics of the first vehicle by dragging the driving point of the second vehicle.

2. The method of claim 1, wherein the synchronizing of the driving characteristics comprises:
    receiving, by the second vehicle via a communication unit, a driving characteristic map, as set based on a driver input, and unique characteristics of the first vehicle; and
    synchronizing the driving characteristics of the second vehicle with the driving characteristics of a first predetermined parameter characteristic data of the second vehicle as determined by a driving characteristic map and unique characteristics of the second vehicle, wherein the driving characteristic data of the first vehicle corresponds to the driving characteristics of the second vehicle.

3. The method of claim 2, wherein the driver input comprises at least one of an accelerator position sensor (APS) value dependent upon driver manipulation of an accelerator pedal or a brake position sensor (BPS) value dependent upon driver manipulation of a brake pedal.

4. The method of claim 2, wherein the driving characteristic map comprises at least one of an APS/wheel-torque map, an APS/hourly-wheel-torque map, or a vehicle-speed/maximum-allowable-driving-force map.

5. The method of claim 2, wherein the unique characteristics of the first vehicle and the driving characteristics of the second vehicle comprise a weight of a vehicle.

6. The method of claim 1, wherein the driving characteristics of the first vehicle are displayed based on a normal mode of the first vehicle.

7. The method of claim 1, wherein the displaying information regarding the driving characteristics of the first vehicle and displaying information regarding the driving characteristics of the second vehicle comprises displaying information regarding the driving characteristics of the second vehicle in comparison with the driving characteristics of the first vehicle.

8. The method of claim 7, wherein the synchronizing of the driving characteristics comprises:
with respect to a predetermined parameter item related to the driving characteristics of the first vehicle, synchronizing a parameter value of a same parameter item as a predetermined parameter item of the first vehicle, wherein the same parameter item is related to the driving characteristics of the second vehicle by clicking a synchronization icon for a vehicle type of the first vehicle.

9. The method of claim 1, further comprising:
when the first vehicle is replaced with a third vehicle,
displaying information on driving characteristics of the third vehicle and the information on the driving characteristics of the second vehicle.

10. The method of claim 1, wherein the information regarding the driving characteristics of the first vehicle and the information regarding the driving characteristics of the second vehicle comprises at least one of an acceleration, a responsiveness, a sensitivity, or a maximum speed of a vehicle in response to driver manipulation of an accelerator pedal or a brake pedal.

11. The method of claim 1, wherein the displayed information regarding the driving characteristics of the first vehicle and the displayed information regarding the driving characteristics of the second vehicle comprises a parameter related to driving characteristics of a vehicle and setup data for control based on the parameter; and wherein the setup data is data that defines a relationship between a control value and a driving input value input by a driver in a vehicle.

12. The method of claim 1, wherein the synchronizing of the driving characteristics comprises converting the information regarding the driving characteristics of the first vehicle into the information regarding the driving characteristics of the second vehicle using information on unique characteristics of the first vehicle and the second vehicle and applying the converted information regarding the driving characteristics of the second vehicle to control logic in the second vehicle.

13. The method of claim 12, wherein the information regarding the driving characteristics of the first vehicle and the information regarding the driving characteristics of the second vehicle comprises setup data that defines a relationship between a control value and a driving input value input by the driver in a vehicle.

14. The method of claim 1, further comprising:

transmitting the information on the driving characteristics of the first vehicle and the second vehicle to a telematics multimedia system (TMS) server or a portable terminal from the first vehicle; and transmitting the information on the driving characteristics of the first vehicle and the second vehicle to the second vehicle from the TMS server or the portable terminal.

* * * * *